Oct. 20, 1970 R. A. GALLMEIER 3,535,541
SYSTEM FOR SEQUENTIALLY CONNECTING A COIL-TRANSFORMING POWER
SUPPLY TO ONE OF A PLURALITY OF INDUCTIVE DEVICES
Filed July 26, 1968
3 Sheets-Sheet 1

INVENTOR
RICHARD A. GALLMEIER
BY John M. Stoudt
ATTORNEY

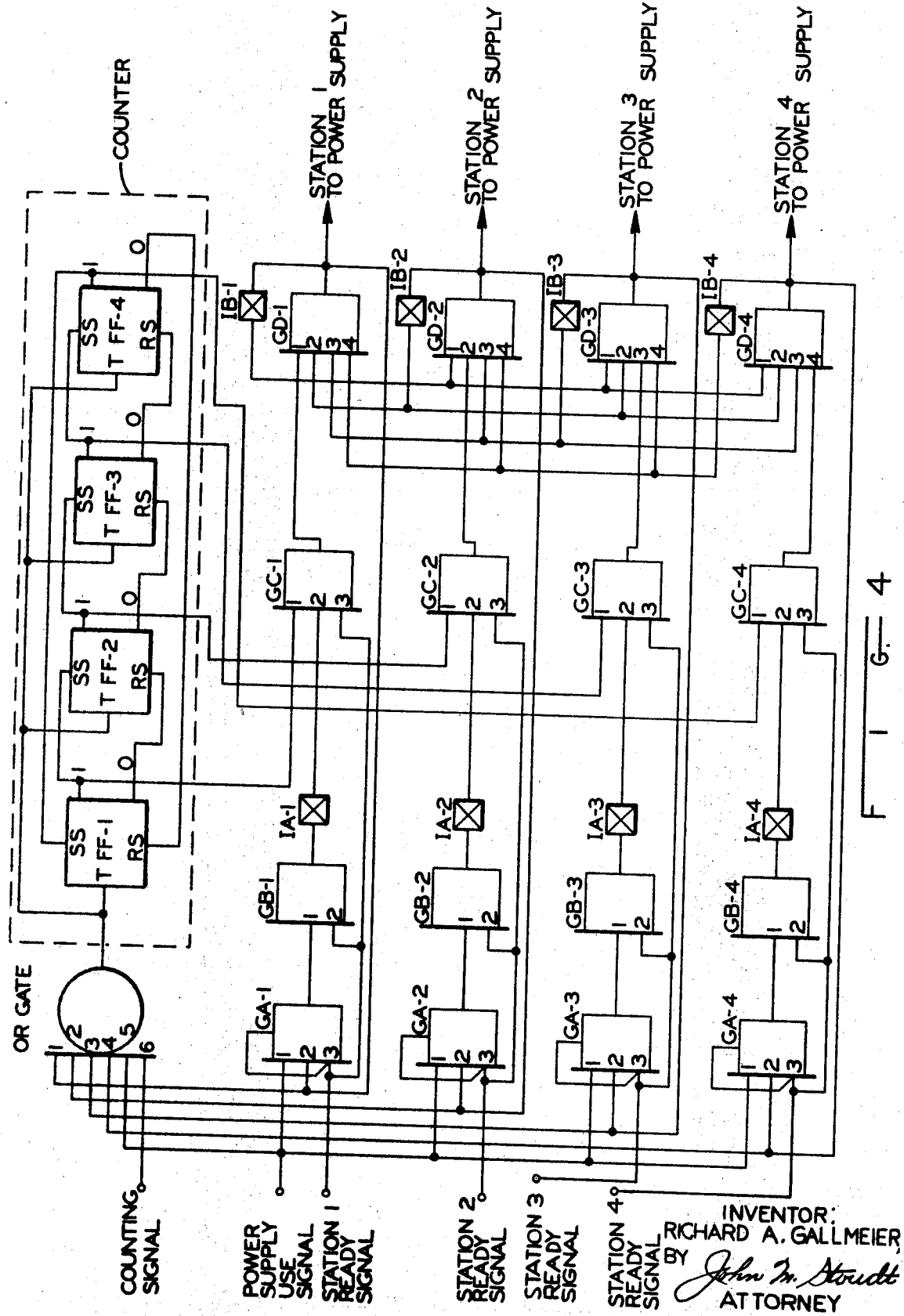

United States Patent Office 3,535,541
Patented Oct. 20, 1970

3,535,541
SYSTEM FOR SEQUENTIALLY CONNECTING A COIL-TRANSFORMING POWER SUPPLY TO ONE OF A PLURALITY OF INDUCTIVE DEVICES
Richard Arthur Gallmeier, Fort Wayne, Ind., assignor to General Electric Company, a corporation of New York
Filed July 26, 1968, Ser. No. 747,975
Int. Cl. H02j 3/00
U.S. Cl. 307—38      9 Claims

ABSTRACT OF THE DISCLOSURE

An inductive device, typically a magnetic core having electrical coils or winding partially positioned in slots, is connected to a pulse power supply to transform the position of the windings in the slots. Since the transforming operation takes a relatively short time, a single power supply may be used to transform the inductive devices in a sequence. The inductive devices are prepared and positioned for transformation at respective stations. When the inductive device at a respective station is ready for transformation, an operator provides a station ready signal to the system. The system comprises a counter and logic circuits which connect the power supply to the station that is ready when the counter reaches the count for that station. After the power supply provides the desired transformation, the system counter begins operating again, and connects other stations in sequence in response to the count and a station ready signal. Thus, a single power supply may be effectively utilized for a plurality of stations.

BACKGROUND OF THE INVENTION

My invention relates to a system for sequentially connecting a coil-transforming power supply to one of a plurality of inductive devices, and particularly to such a system for automatically connecting the power supply to the inductive devices in sequence as each inductive device is ready for transformation.

In the manufacture of inductive devices, electrical coils of insulated conductors are transformed in the slots of magnetic cores into the desired configuration. Some of the more desirable procedures use electrical energy to perform various coil transforming operations, as disclosed in U.S. Pat. Nos. 3,333,327; 3,333,328; 3,333,329;3,333,330; and 3,33,335, all of which issued Aug. 1, 1967. As disclosed in those and other patents, one or more pulses or surges of electrical energy are generated in the coils of the inductive devices so as to move the coil turn portions away from exposed or uninsulated parts of the magnetic core and to compact or press the coil turns into the desired position with respect to the magnetic core. This procedure is very effective, and requires only a relatively short period of time to provide the desired coil and core transformation. In fact, the time required to effect the transformtion requires only a few seconds, whereas, the time required to produce a winding and place it in position on the core for transformation requires several minutes. It will be apparent that if a single power supply is provided for a single position or station where cores and coils are produced and assembled, the power supply would be idle or a large portion of its available working time.

Accordingly, an object of my invention is to provide an improved system which permits a single power supply to be utilized at a number of stations where inductive devices are assembled for transformation.

Another object of my invention is to provide an improved apparatus or system for sequentially connecting a single power supply to a plurality of operator stations where magnetic coils and cores are assembled for transformation and, if no other stations are using the power supply, quickly connecting the power supply to a station that is ready.

Still another object of my invention is to provide an improved system which can sequentially connect a single coil-transforming power supply to a plurality of stations where inductive devices are assembled, so that all stations have the power supply available to them in an orderly sequence.

Another object of my invention is to provide an improved system for sequentially connecting a transforming power supply for inductive devices to a plurality of stations so that no single station can predominately use the power supply to the detriment or exclusion of other stations.

SUMMARY OF THE INVENTION

Briefly, these and other objects are achieved in accordance with one form of my invention by a system which is adapted to be used with a plurality of stations. Each station comprises means to which the inductive device is connected for being energized and transformed by the power supply. When a station is ready to have its inductive device transformed, the station operator supplies a station ready signal to the system. The system includes a counter which produces a sequence of signals, each signal corresponding to an individual station. As the counter produces the sequence of signals, means respond to the respective count signal for a station and a station ready signal to produce an enabling signal. This enabling signal connects the power supply to the station which produced the station ready signal. The enabling signal also prevents the other stations from having their load connected to the power supply, and also stops the counter. As the power supply produces the transformation pulses required, it supplies a use signal to the system. At the end of the use signal, the counter is permitted to start, so that the counter can again begin counting in sequence, and stops the enabling signal so that the other stations may utilize the power supply. The counter continues its count in sequence until another station ready signal and counter signal are produced at the same time. Then, the station which corresponds to the count signal and the station ready signal utilizes the power supply. Thus, my system permits a single power supply to be effectively and economically used at a plurality of stations where inductive devices are assembled and positioned for transformation.

BRIEF DESCRIPTION OF THE DRAWINGS

The subject matter which I regard as my invention is particularly pointed out and distinctly claimed in the claims. The structure and operation of my invention, together with further objects and advantages, may be better understood from the following description given in connection with the accompanying drawings, in which:

FIG. 4 shows an electrical diagram of my system;

DESCRIPTION OF THE PREFERRED EMBODIMENT

In explaining my system, I have assumed that a single power supply is to be utilized with four stations at which inductive devices are prepared and assembled. However, it is to be understood that my system can be used with a single power supply for any number of such stations.

Figure 1:
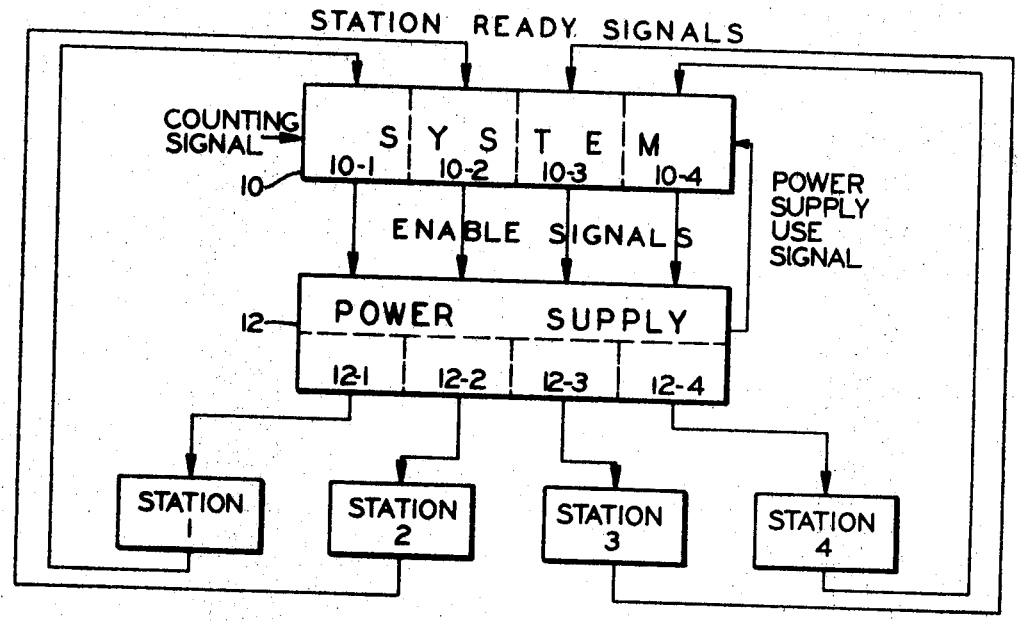
FIG. 1 shows a block diagram of my system connected to a power supply and four stations at which inductive devices are transformed.

In FIG. 1, I have shown my system 10 connected to a power supply 12 to connect the power supply 12 in sequence to one of four stations. Since the system 10 is designed to operate with four stations, it may be considered to have four control sections 10–1, 10–2, 10–3, 10–4, as indicated. The system 10 has a counter that has four stages which operate in sequence to provide a respective count signal to each of the control sections 10–1, 10–2, 10–3, 10–4. The four control sections provide enabling signals to the power supply 12, so that the power supply 12 can be connected through one of four sets of switch contacts 12–1, 12–2, 12–3, 12–4 to a respective station. When a given station is ready for transformation, the station operator pushes a button to supply a station ready signal to its respective control section of the system 10. When the count signal reaches the count corresponding to the station that is ready, the system 10 enables the power supply 12 and connects the power supply 12 to that respective station. The power supply 12 produces a use signal which is supplied to the system 10 so that the station using the power supply 12 can not utilize the power supply 12 again until the system counter has gone through a full count sequence. Each of the stations also include a switch which, as will be explained, is connected to a protective cage so that the cage must have been previously opened and then closed before the station ready signal can be produced.

Figure 2:
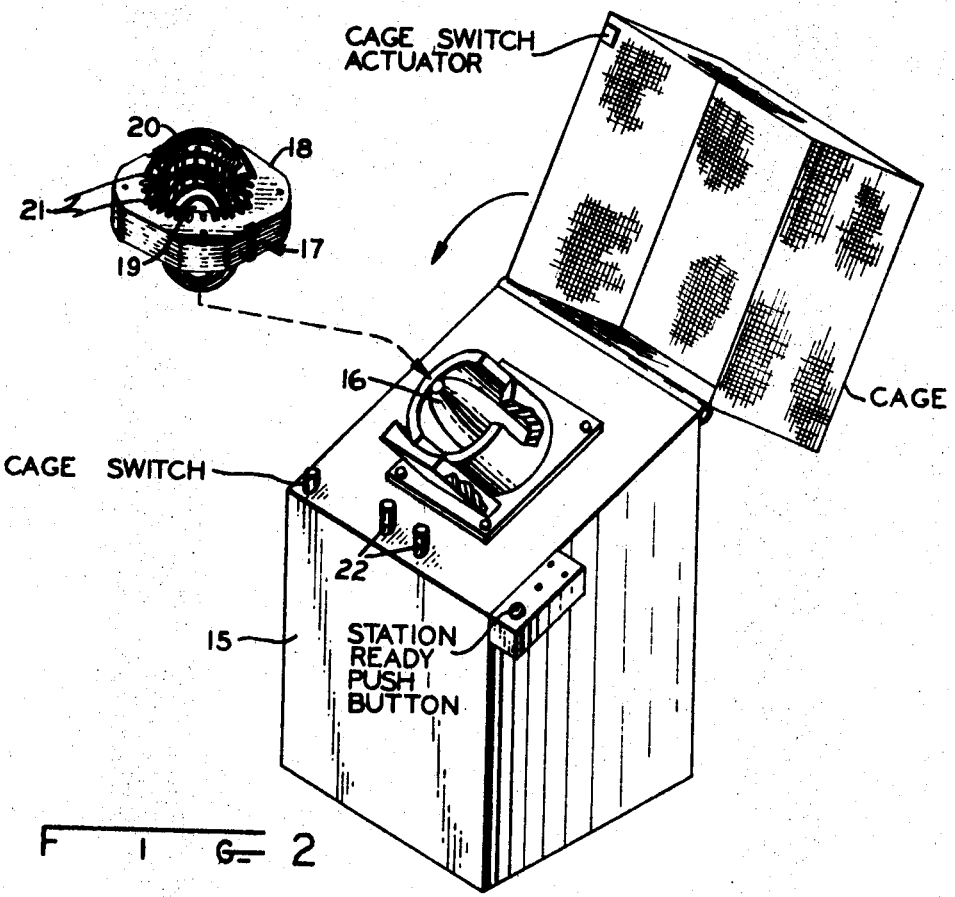
FIG. 2 shows a perspective view of a typical station at which the inductive device is transformed.

FIG. 2 shows a view of one of the stations at which an inductive device is transformed. The station includes a pedestal or console 15 having a suitable structure 16 on which an illustrative inductive device 17 is positioned for transformation. The structure 16 may be of such types as those disclosed in U.S. Pat. Nos. 3,333,328 or 3,333,330 mentioned above when used in the generation of a suitable electrical energy pulse in the inductive device in the illustrated form of a motor stator 18 having a bore 19 around which windings or coils 20 are positioned in slots for transformation. The windings or coils 20 are connected in the desired configuration and brought out on leads 21. The device 17 is positioned on the console 15 with the structure 16 in its bore 19, and the leads 21 are connected to suitable terminals 22. The terminals 22 and operative connections within the structure 16 are connected to the respective set of switch contacts in the power supply 12 so as to be energized or connected in the desired arrangement for transformation. The console may be provided with a protective cage so that personnel can not come in contact with any potentially hazardous electrical voltages. In order that the inductive device 17 can be positioned on the structure 16, the cage must be open as shown. After the device 17 is positioned, the cage may be closed as indicated by the arrow. When the cage is moved to its closed position, a cage switch actuator engages a cage switch to close its normally open contacts. These contacts are connected in series with a relay winding. This relay winding is connected in series with a station ready pushbutton which may be placed along the side of the console 15 in a suitable operating box or control. The station shown in FIG. 2 is exemplary only, since the stations may take other forms, such as shown in the pending U.S. Pat. No. 3,407,468, issued to William E. Baldwin on Oct. 29, 1968 and assigned to General Electric Company, assignee of the present invention. Also, more than one core and coil may be simultaneously transformed at a single station as disclosed in the patents already mentioned.

Figure 3:
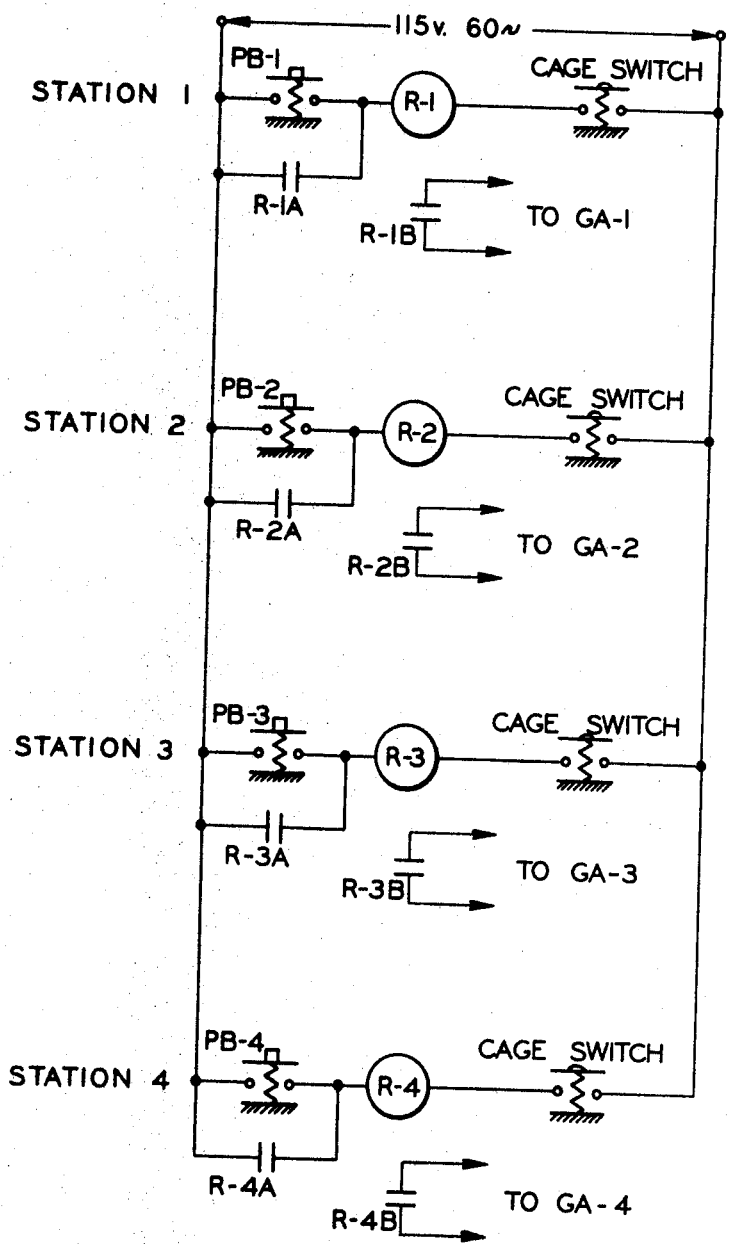
FIG. 3 shows an electrical diagram of the signal means provided at the four stations of FIG. 1.

FIG. 3 shows an electrical diagram of the apparatus which can be provided at the four stations, which may be located remote from one another or in juxtaposition, as desired. The apparatus has suitable power, such as 115 volts, 60 cycles. The contacts and switches normally have the open positions shown. If, for example, the operator at station 3 has positioned the inductive device 17 on the structure 16 and connected the leads 21 to the terminals 22, the cage at station 3 can be closed. The actuator closes the contacts of the cage switch. This permits one side of the power supply to be connected to one side of the station 3 relay winding R–3. After the cage is closed, the operator at station 3 then operates the station ready pushbutton PB–3, which connects the other side of the relay winding R–3 to the other side of the power supply. The relay winding R–3 causes its associated contacts R–3A to close, so that the relay winding R–3 is sealed in, even after the pushbutton PB–3 is released. Also, a set of associated contacts R–3B are closed, and these closed contacts provide the station ready signal to the appropriate control section of the system. Other stations are operated in the same manner.

An electrical diagram of the system 10 of FIG. 1 is shown in FIG. 4. The system 10 includes a counter that is shown enclosed in dashed lines. The counter may take any number of forms, but I have shown the counter as including four flip-flops FF–1, FF–2, FF–3, FF–4 for the four stations that the system is intended to serve. These flip-flops comprise bistable multivibrators which are known in the art, and which include a trigger input T, a set steering input SS, a reset steering input RS, a logic 1 output, and a logic 0 output. The flip-flops FF–1, FF–2, FF–3, FF–4 are connected in a ring fashion, and each of the trigger inputs T is connected to the output of a six input OR gate. Input 6 of the OR gate is supplied with a counting signal having the desired frequency, for example 30 pulses per second. This counting signal may be provided from any suitable source, such as 60 cycle voltage. These pulses switch between a logic 0 and a logic 1, and if no other logic 1 is present at the other inputs of the OR gate, the transition from a logic 0 to a logic 1 triggers the flip-flops in sequence. If any one of the other inputs to the OR gate is at a logic 1, the counting signal has no effect, and the counter stands still or is blocked.

In each of the control sections for the stations, I provide four logic gates GA, GB, GC, GD, and two logic inverters IA, IB. In FIG. 4, it will be seen that each logic element for a particular station is given the suffix numeral corresponding to that station. Thus, the logic gate GA for station 1 has the designation GA–1. The logic gates and inverters shown in FIG. 4 are known, but will be briefly explained. The logic gate GA is a three input, sealed AND gate. This gate GA produces a logic 1 output in response to its three inputs being at a logic 1, and continues to produce a logic 1 output after inputs 1 and 2 become a logic 0, so long as the input 3 is at a logic 1. The gate GB is a two input AND gate which produces a logic 1 output in response to the two inputs being at a logic 1. The inverter IA reverses the logic applied to it, so that a logic 1 supplied to the inverter IA causes a logic 0 to be produced at the output, and so that a logic 0 applied to the inverter IA causes a logic 1 to be produced at the output. The gate GC is a three input AND gate which produces a logic 1 at its output in response to the three inputs being at a logic 1. The gate GD is a four input AND gate which produces a logic 1 at its output in response to its four inputs being at a logic 1. The logic inverter IB is similar to the inverter IA.

The connections for the logic elements for the control section of station 1 will be described, and it is to be understood that similar connections are provided for the control sections of stations 2, 3, and 4. The power supply use signal is supplied to the input 1 of the gate GA–1 (and also the input 5 of the OR gate and the inputs 1 of the gates GA–2, GA–3, GA–4). The station 1 ready signal is applied to the seal input 3 of the gate GA–1, to the input 2 of the gate GB–1, and to the input 3 of the gate GC–1. The input 2 of the gate GA–1 is connected to the output of the gate GD–1, and to the input 1 of the OR gate. The output of the gate GA–1 is connected to the input 1 of the gate GB–1, and the output of the gate GB–1 is inverted by the inverter IA–1 and connected to the input 2 of the gate GC–1. The input 1 of the gate GC–1 is connected to the logic 1 output of the flip-flop FF–1 in the counter. The output of the gate GC–1 is connected to the input 1 of the gate GD–1. As mentioned, the output of the gate GD–1 is coupled to the input 2 of the gate GA–1 and to the input 1 of the OR gate. When the output of the gate GD–1 is at a logic 1, this output serves to energize or enable the power supply 12 of FIG. 1, and to cause the power supply 12 to be connected to the station 1 for transformation. The output of the gate GD–1 is also inverted by the inverter IB–1, and this inverted output is applied to the input 1 of the other gates GD–2, GD–3, GD–4.

The other logic elements for the stations 2, 3, and 4 are similarly connected. It is to be understood, of course, that the inverted outputs of the gates GD–2, GD–3, GD–4 are coupled to respective inputs of each of the other gates GD of the other stations, and that the normal outputs of the gates GD–2, GD–3, GD–4 are coupled to the respective inputs of the OR gate.

SYSTEM OPERATION

As an example of the operation of my system, I have assumed that four stations are being used at remote locations, one from the other, and that the operators are preparing and positioning inductive devices on their consoles 15 as they are ready. First, I have assumed that no station is ready for a transforming operation, so that the outputs of all of the gates GD are at a logic 0. Since the power supply is not in use, the power supply use signal is also at a logic 0. Thus, the first five inputs of the OR gate are at a logic 0. With the counting signal applied, the input 6 of the OR gate is changing from logic 0 to logic 1 and from logic 1 to logic 0 at the assumed 30-cycle rate. This causes the counter to count at a 30-cycle rate. Next, it is assumed that the operator at station 3 finishes the assembly of an inductive device 17, places it on the structure 16, connects it to the terminal 22, and then closes the cage on his console 15. With respect to FIG. 3, this closes the cage switch contacts associated with station 3. Then, the operator at station 3 pushes his station ready pushbutton PB–3. This permits the relay winding R–3 to become energized, and closes the contacts R–3A and R–3B. The contacts R–3A seal in the relay winding R–3 so that it remains energized until the station 3 cage switch contacts open. The contacts R–3B also close, and these contacts supply a logic 1 to the input 3 of the gate GA–3. Although the input 3 of the gate GA–3 is now at a logic 1, the input 1 of this gate GA–3 is at a logic 0 because the power supply is not yet in use. Also, the input 2 of the gate GA–3 is at a logic 0 because the output of the gate GD–3 is at a logic 0 at this time. Hence, a logic 0 is provided at the output of the gate GA–3. However, the logic 1 supplied by the station 3 ready signal is also applied to the input 2 of the gate GB–3 and to the input 3 of the gate GC–3. The input 1 of the gate GB–3 is at a logic 0, so that the output of the gate GB–3 is at a logic 0. This logic 0 is inverted by the inverter IA–3 to a logic 1 so that the input 2 of the gate GC–3 is at a logic 1. The input 1 of the gate GC–3 is at logic 0, since the counter is assumed to be at some count other than station 3. The output of the gate GC–3 is at logic 0, which causes the output of the gate GD–3 to be a logic 0 also. The outputs of the gates GD–1, GD–2, GD–4 are each a logic 0 which is inverted by the inverters IB–1, IB–2, IB–4 to a logic 1. Hence, the inputs 1, 2, and 4 of the gate GD–3 are a logic 1.

As the counter continues its count, the sequence of counting is such that eventually the flip-flop FF–3 (corresponding to station 3) switches so that its output terminal 1 becomes a logic 1. This logic 1 is applied to the input 1 of the gate GC–3, so that all three inputs of this gate GC–3 are at a logic 1. This causes the output of the gate GC–3 to provide a logic 1 or enabling signal which is applied to the input 3 of the gate GD–3. Since the other inputs 1, 2, and 4 of the gate GD–3 are at a logic 1, this enabling signal or logic 1 causes the gate GD–3 to produce a logic 1 at its output. This logic 1 is utilized to enable or energize the power supply 12 of FIG. 1, and to operate appropriate switches or relays that connect the power supply 12 to the station 3 so as to transform the inductive load 17 at station 3. This logic 1 output is also inverted by the inverter IB–3 so that a logic 0 is produced by the inverter IB–3 which is applied to the input 3 of each of the gates GD–1, GD–2, and GD–4. Thus, the outputs of the gates GD–1, GD–2, and GD–4 become a logic 0 so that the power supply 12 can not be connected to the stations 1, 2, and 4. The logic 1 output from the gate GD–3 is also connected back to the input 2 of the gate GA–3, and to the input 2 of the OR gate. When the input 2 of the OR gate becomes a logic 1, this logic 1 maintains the output of the OR gate at a logic 1. Thus, the counting signal has no effect so that the counter stops counting.

During the time that the power supply is in use at station 3, the power supply use signal switches from a logic 0 to a logic 1, so that the input 1 of the gate GA–3 is at a logic 1. When the output of the gate GD–3 switches to a logic 1, all three inputs of the gate GA–3 become a logic 1 so that a logic 1 is produced at its output. This logic 1 is supplied to the input 1 of the gate GB–3, and the input 2 of this gate GB–3 is already at a logic 1. A logic 1 output is produced by the gate GB–3, and is inverted by the inverter IA–3 to a logic 0. Thus, the input 2 of the gate GC–3 is at a logic 0, so that the output of the gate GC–3 and the input 3 of the gate GD–3 change to a logic 0 as soon as the power supply begins to be used. However, the power supply is arranged so that once it begins to be used, it goes through its complete cycle of transformation. After the power supply has been used for one cycle, it causes its power supply use signal to switch back to a logic 0. Thus, the inputs 1 and 2 of the gate GA–3 become a logic 0. However, the sealing input 3 of the gate GA–3 is still at a logic 1, because station 3 is still producing the logic 1 ready signal. Hence, the output of the gate GA–3 remains at a logic 1, this output being applied to the input 1 of the gate GB–3. The input 2 of the gate GB–3 is at a logic 1, so that the output of the gate GB–3 remains at a logic 1 which is inverted to a logic 0 by the inverter IA–3. Thus, the gate GC–3 has a logic 0 applied to its input 2, so that no enabling signal can be provided by the gate GC–3 until the station ready signal is removed. This is an important feature of my invention in that it prevents an operator at a station from monopolizing the system to the exclusion of the other stations. The station ready signal can be broken only by opening the cage to open the cage switch and deenergize the relay winding R–3. When this occurs, the station ready signal is removed so that the gate GA–3 again produces a logic 0. This logic 0 permits the gate GB–3 to produce a logic 0 which is inverted to a logic 1 by the inverter IA–3, so that the gate GC–3 can again respond to a count signal and to a station ready signal.

The output of the gate DG–3 switches to a logic 0 very shortly after the power supply begins to be used. This logic 0 is coupled back to the input 3 of the OR gate, but the OR gate still prevents the counting signal from being effective until after the power supply use signal returns to a logic 0. When the power supply has completed its cycle of operation at station 3, the use signal returns to a logic 0, and the counting signal begins to operate on the counter. Then, the counter begins its count again, going through the flip-flop FF–4, the flip-flop FF–1, the flip-flop FF–2, the flip-flop FF–3, and so on.

When the operator at another station is ready to have an inductive device transformed, the operator at such other station, for example station 1, may operate his station ready pushbutton. This causes the logic control section for station 1 to go through the same sequence as described for station 3. Thus, each of the stations may utilize the power supply whenever they are ready, and in the sequence determined by the counter. The system can not respond to the simultaneous operations of two pushbuttons at two stations, since the counter will permit only the station first in the counting sequence to utilize the power supply. However, as soon as the power supply has finished with that first station, the counter again begins operation, and permits the second station in the counting sequence to utilize the power supply.

It will thus be seen that my system permits a single power supply to be utilized effectively at a plurality of transforming stations. Thus, a relatively expensive power supply can be utilized at a plurality of stations, and serve the plurality of stations with a minimum of delay, and with an effective distribution of the use.

While I have described my system with reference to only a single embodiment, persons skilled in the art will appreciate that modifications may be made. For example, various types of counters may be used other than the flip-flop type of ring counter shown. Further, different ways may be used to produce the station ready signal, and then remove this signal. However, it is important to require removal of this signal so that an operator can not monopolize the power supply. And, various specific arrangements may be used to connect the power supply to the station for a transformation cycle. Moreover, various types of transformation cycles may be used. Therefore, while my invention has been described with reference to a particular embodiment, it is to be understood that modifications may be made without departing from the spirit of the invention or from the scope of the claims.

What I claim as new and desire to secure by Letters Patent of the United States is:

1. A system for sequentially connecting a power supply to one of a plurality of stations, each station having a device formed by a magnetic core and coil which is transformed in said magnetic core in response to a pulse of energy from said power supply, said system comprising:
   (a) first means for producing a sequence of station signals, each of which corresponds to a respective one of said stations;
   (b) and a plurality of station controls, each of said station controls having sensing means to sense that its respective station is ready to be connected to said power supply, second means connected to said sensing means and to said first means for producing an enabling signal in response to said station being ready and in response to its respective station signal, and third means connected to said second means and adapted to be connected to said power supply for rendering said power supply operative and for connecting said power supply to the corresponding station load in response to said enabling signal.

2. The system of claim 1 wherein each of said station controls further has means connecting its third means to said first means for stopping said sequence of signals in response to an enabling signal.

3. The system of claim 1 wherein each of said station controls further has means connecting its third means to each of said other third means for preventing utilization of said power supply by each of said other third means in response to an enabling signal.

4. The system of claim 1 wherein each of said station controls further has means connecting its third means to said first means for stopping said sequence of signals in response to an enabling signal, and means connecting its third means to each of said other third means for preventing utilization of said power supply by each of said other third means in response to an enabling signal.

5. The system of claim 4 wherein each of said station controls further has means connected to its sensing means and to its second means to prevent its second means from producing an enabling signal until its sensing means has sensed the end of a previous utilization of said power supply at its respective station.

6. Apparatus for connecting a transforming power supply to one of N stations, where N is any integer greater than one, said power supply comprising means to produce a use signal during the time said power supply is in use, each of said stations comprising a device having a magnetic core and coil that are to be transformed relative to each other by a pulse of energy from said power supply, means to provide a ready signal indicating that the station has its device positioned and connected, and means to provide a release signal after transformation is complete, said apparatus comprising:
   (a) a counter for repetitively producing N count signals in sequence and at a selected rate;
   (b) N control sections, each of said control sections having:
      (1) first means connected to said counter for sensing the respective count signal for the control section;
      (2) second means adapted to be connected to the station means for sensing a ready signal from the respective station;
      (3) third means connected to said first and second means for producing an enabling signal in response to the simultaneous presence of a respective count signal and a ready signal;
      (4) fourth means connected to said third means and adapted to be connected to said power supply to operate said power supply and to connect said power supply to the device corresponding to the respective station whose control section produced an enabling signal;
   (c) and fifth means connecting said fourth means of each of said control sections to said fourth means of each of said other control sections for preventing utilization of said power supply by the other control sections in response to the fourth means of one control section utilizing said power supply.

7. The apparatus of claim 6 wherein each of said control sections further has means connecting said fourth means to said counter for stopping said count signals in response to an enabling signal.

8. The apparatus of claim 6 wherein each of said control sections further has means connected to said second and third means to prevent said third means from producing an enabling signal until said second means has sensed the end of a previous ready signal from the respective station.

9. The apparatus of claim 8 wherein each of said control sections further has means connecting said fourth means to said counter for stopping said count signals in response to an enabling signal.

References Cited

UNITED STATES PATENTS

| | | | |
|---|---|---|---|
| 2,869,110 | 1/1959 | Wagner. | |
| 2,971,135 | 2/1961 | Ebert | 307—38 X |
| 3,359,426 | 12/1967 | Burr | 307—38 |
| 3,433,972 | 3/1969 | Harris | 307—38 |

LEE T. HIX, Primary Examiner

U.S. Cl. X.R.

307—150, 154